United States Patent
Barel (10) Patent No.: US 10,153,077 B2
(45) Date of Patent: Dec. 11, 2018

(54) INPUT DEVICE ATTACHMENT/DETACHMENT MECHANISM FOR COMPUTING DEVICES

(71) Applicant: Microsoft Technology Licensing, LLC, Redmond, WA (US)

(72) Inventor: Eliyahu Barel, Beit Ariye (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 15/242,081

(22) Filed: Aug. 19, 2016

(65) Prior Publication Data

US 2018/0053588 A1 Feb. 22, 2018

(51) Int. Cl.
| | |
|---|---|
| *G06F 1/16* | (2006.01) |
| *G06F 3/0354* | (2013.01) |
| *H01F 7/04* | (2006.01) |
| *H01F 7/02* | (2006.01) |
| *G06F 3/038* | (2013.01) |
| *G06F 3/0488* | (2013.01) |
| *G06F 3/01* | (2006.01) |

(52) U.S. Cl.
CPC ......... *H01F 7/0252* (2013.01); *G06F 1/1607* (2013.01); *G06F 1/1656* (2013.01); *G06F 3/017* (2013.01); *G06F 3/038* (2013.01); *G06F 3/03545* (2013.01); *G06F 3/04883* (2013.01); *H01F 7/04* (2013.01); *G06F 2200/1632* (2013.01)

(58) Field of Classification Search
CPC .. H01F 7/0252; G06F 1/1656; G06F 3/03545; G06F 3/038; G06F 3/04883
See application file for complete search history.

(56) References Cited

U.S. PATENT DOCUMENTS

| | | | |
|---|---|---|---|
| 8,964,379 B2 | 2/2015 | Rihn et al. | |
| 8,988,876 B2 | 3/2015 | Corbin et al. | |
| 9,063,693 B2 | 6/2015 | Raken et al. | |
| 9,130,396 B2 | 9/2015 | Leydon | |
| 9,507,381 B1* | 11/2016 | Vanderet | G06F 1/1656 |
| 2002/0190823 A1* | 12/2002 | Yap | G06F 1/1616 335/205 |
| 2010/0263172 A1 | 10/2010 | Wein et al. | |
| 2011/0283188 A1* | 11/2011 | Farrenkopf | G06F 3/0488 715/702 |

(Continued)

OTHER PUBLICATIONS

Guim, Mark, "6 other ways to attach the Surface Pen to the Surface Pro 3", Published on: May 21, 2014 Available at: http://www.windowscentral.com/6-ways-attach-surface-pen-surface-pro-3.

(Continued)

*Primary Examiner* — Ibrahim A Khan (74) *Attorney, Agent, or Firm* — Arent Fox LLP (57) ABSTRACT

Aspects described herein generally relate to a computing device and a corresponding input device. The computing device may include a housing including at least one component of the computing device. An input device can be removably attachable to at least a portion of the housing. The computing device may also include one or more electromagnets mounted within the housing, wherein the one or more electromagnets have a detach state that generates a first magnetic field in a direction that opposes a second magnetic field that attracts the input device to the housing.

22 Claims, 8 Drawing Sheets

(56) References Cited

U.S. PATENT DOCUMENTS

| | | |
|---|---|---|
| 2012/0121311 A1 | 5/2012 | Torres |
| 2013/0009907 A1 | 1/2013 | Rosenberg et al. |
| 2013/0106723 A1* | 5/2013 | Bakken ............... G06F 3/03545 345/173 |
| 2013/0162589 A1* | 6/2013 | Lien ....................... G06F 3/046 345/174 |
| 2013/0229386 A1 | 9/2013 | Bathiche et al. |
| 2014/0049911 A1* | 2/2014 | Corbin ................. A45C 13/002 361/679.58 |
| 2015/0035809 A1 | 2/2015 | Kim et al. |
| 2016/0109968 A1* | 4/2016 | Roh .................... G06F 3/03545 345/173 |
| 2016/0291702 A1* | 10/2016 | Lee ........................ G06F 3/038 |

OTHER PUBLICATIONS

"Using Surface Pen (Surface Pro 4 version)", Retrieved on: Feb. 12, 2016 Available at: https://www.microsoft.com/surface/en-us/support/hardware-and-drivers/surface-pen-pro-4#pairWin10.

* cited by examiner

INPUT DEVICE ATTACHMENT/DETACHMENT MECHANISM FOR COMPUTING DEVICES

BACKGROUND

Use of computing devices is becoming more ubiquitous by the day. Computing devices range from standard desktop computers to wearable computing technology and beyond. One area of computing devices that has grown in recent years is tablet computers and hybrid computers. Hybrid computers may act as a tablet computer or a laptop computer, and may include input devices that may be coupled to or separated from (e.g., removably attached to) the hybrid computer. For instance, in some hybrid computers, the input device may be attachable to a portion of the hybrid computer that includes a display, where such portion may also include other components that facilitate operation of the computer (e.g., processor, memory, etc.). In some examples, the input devices may include a pen device, such as a passive pen device that can be used to provide input on a touch-enabled display of the computer where the computer processes the input as touch input on the display, or an active pen device that is independently powered and can provide additional forms of input that may be detected at the pen device (e.g., pressing of a tip against the display or other surface, activation of one or more switches or buttons on the pen device, etc.).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computing device is provided including a housing including at least one component of the computing device, an input device removably attachable to at least a portion of the housing, and one or more electromagnets mounted within the housing, wherein the one or more electromagnets have a detach state that generates a first magnetic field in a direction that opposes a second magnetic field that attracts the input device to the housing.

In another example, a method for detaching an input device from a computing device is provided. The method includes detecting, via a processor, an event to detach the input device from the computing device, where the input device is removably attached to the computing device, and activating, via the processor, power to one or more electromagnets based at least in part on detecting the event. The one or more electromagnets have a detach state that, when powered, generate a first magnetic field in a direction that opposes a second magnetic field that attracts the input device to a housing of the computing device.

In another example, an input device for a computing device is provided. The input device includes a housing, a plurality of indicators for indicating one or more parameters of the input device, a plurality of contact pins providing a charge receiving element for charging a battery of the input device, and a rotatable member rotatable around at least a portion of the housing, wherein the rotatable member defines a plurality of apertures. The rotatable member is rotatable to a first rotational position over the plurality of indicators to facilitate display of light from the plurality of indicators through the plurality of apertures, and a second rotational position over the plurality of contact pins to facilitate protrusion of the contact pins from the plurality of apertures.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to a computing device having a mechanism to attach an input device to a housing of the computing device and/or detach or facilitate detachment of the input device from the housing of the computing device. In an example, the computing device can include one or more components to generate a magnetic field to attach the input device to the housing, such as one or more permanent magnets, one or more electromagnets, one or more permanent electromagnet (PEM), etc. Similarly, the input device may include one or more components attracted to the magnetic field, such as one or more ferromagnetic materials (of which a portion of a housing of the input device can be composed), one or more permanent magnets or electromagnets (e.g., that generate an attracting magnetic field having an opposite pole than the magnetic field generated at the computing device), etc. In an example, the computing device can also include one or more electromagnets, PEMs, etc. that, when activated, can generate an opposing magnetic field that opposes the magnetic field attracting the input device to the housing, which can ease or otherwise facilitate or cause detaching the input device from the housing. Moreover, though generally described in terms of a computing device having the one or more electromagnets, PEMs, etc. to generate the opposing magnetic field, in other examples the input device may include such electromagnet(s), PEMs, etc.

In one specific example, the input device can include a pen device that can be attached to a side wall of the housing of the computing device. The side wall may additionally include an edge groove within which the pen device can be at least partially removably attached to the housing. The computing device may include one or more permanent magnets adjacent to the side wall that can attract the pen device to the housing. For example, the pen device may also include one or more permanent magnets or may be composed of ferromagnetic materials (e.g., steel), etc., such to facilitate attraction and attachment of the pen device to the housing (and specifically in the edge groove). The one or more permanent magnets can generate a magnetic field having a field strength sufficient to hold the pen device to the housing.

The computing device can also include one or more electromagnets positioned near or surrounding the permanent magnets adjacent to the housing such that the electromagnet(s), when activated (e.g., powered), can effectively generate an opposing magnetic field that at least partially cancels the magnetic field generated by the permanent magnets within the housing of the computing device. In other words, the electromagnet(s) can generate an opposing magnetic field having an opposing field strength sufficient to create, in combination with the magnetic field of the permanent magnet(s), an effective magnetic field on the pen device that eases removal of the pen device from the housing (e.g., strong enough to prevent the pen device from falling off, but weak enough to allow the pen device to be easily removed). For example, a switch within the computing device can control power to the electromagnetic such that when the switch is activated, the electromagnet can generate the opposing magnetic field (e.g., for at least a period of time or until detection of another event), which can allow for eased detaching of the pen device from the housing as the magnetic force attracting the pen device is at least partially cancelled by the electromagnet. When the electromagnet is no longer powered (e.g., which can occur based on detecting a period of time after the switch is activated, activation of another button, etc.), the pen device can again be attracted and attached to the housing via the permanent magnets when the pen device is within a range to be attracted to the permanent magnets.

In other examples, an input device may be attached to other portions of the housing of the computing device. In a specific example, the housing beneath a touch panel and/or display of the computing device may provide a magnetic field, and the input device may be attracted to the magnetic field through the touch panel and/or display (and thus may be attached to the touch panel and/or display by the attraction). Similarly, in this example, one or more electromagnets can be provided adjacent to the housing beneath the touch panel and/or display, activation of which can at least partially cancel the magnetic field provided to otherwise attract the input device to the touch panel and/or display of the computing device.

In another example, the housing beneath touch panel/display can include a ferromagnetic part, and the input device can include a permanent magnet or electromagnet (e.g., PEM), such that an input device can control the activation or deactivation of the magnetic field. In this example, the input device may have a mechanical or electromechanical mechanism (e.g., a switch, button, initiation of a Bluetooth communication with the computing device, gesture recognition, etc.) to cause activation/deactivation of the magnetic field (e.g., of the electromagnet controlling the magnetic field).

The concepts and functions described herein allow for the use of substantially higher levels of magnetic attraction, beyond that used in conventional devices, for attaching the input device to the computing device to improve the strength of the attachment, as the attracting magnetic field can be at least partially cancelled when desired to facilitate detaching the input device. This can prevent unwanted detachment of the input device, for example when the computing device is stored in a bag, jostled by movement of the bag, etc., for input devices such as pen devices, or when the computing device is tilted in a certain configuration for input devices attracted to the touch panel and/or display, etc.

Figure 1:
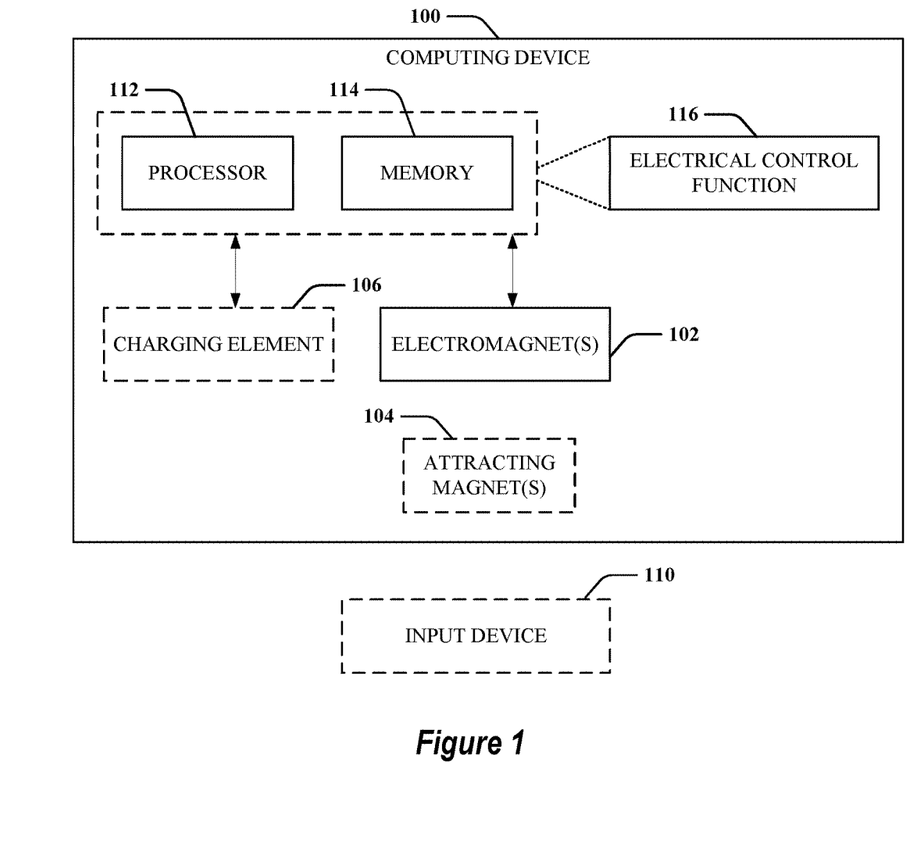
FIG. 1 is a schematic diagram of an example of a computing device that facilitates removable attachment of an input device in accordance with aspects described herein.
Figure 2:
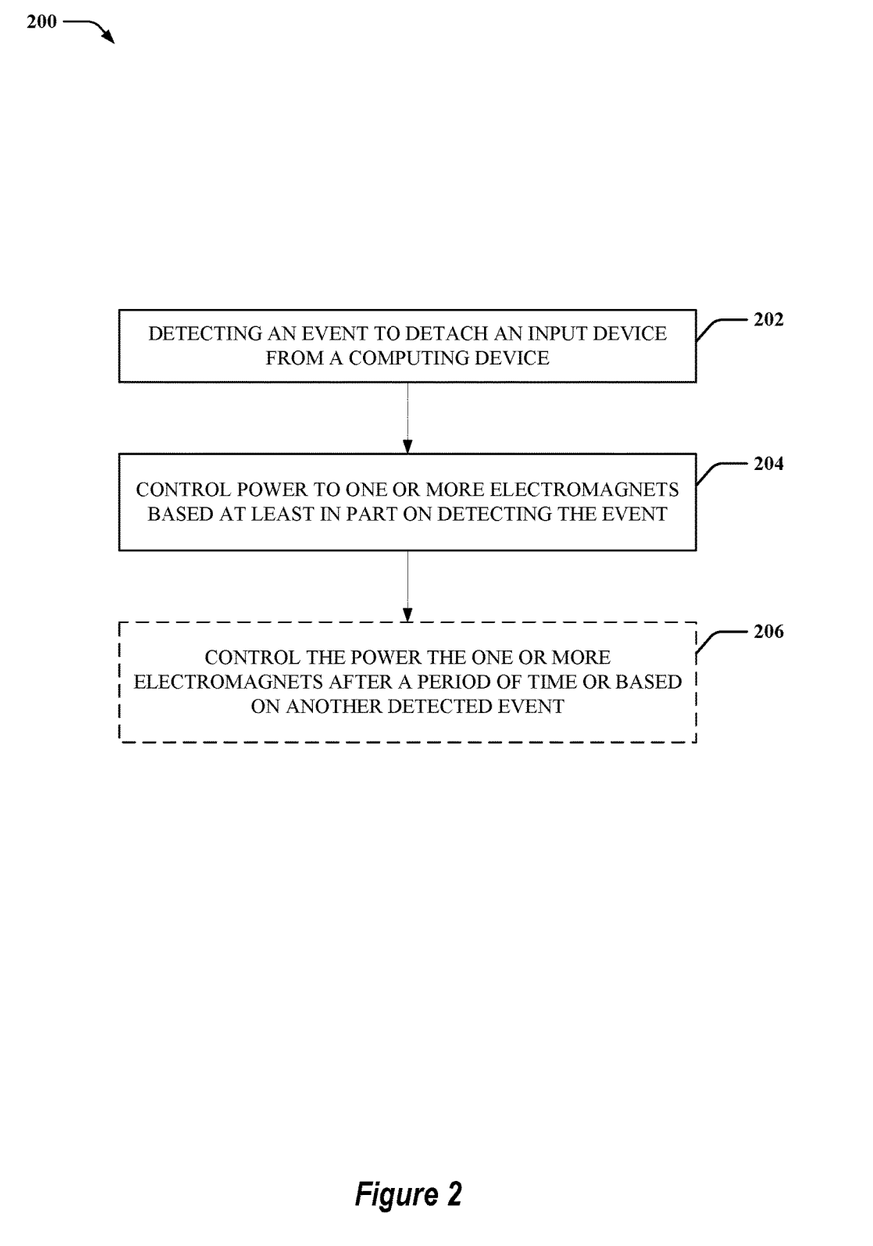
FIG. 2 is a flow diagram of an example of a method for detaching an input device in accordance with aspects described herein.

Turning now to FIGS. 1-2, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 that can include a plurality of magnets for attaching an input device 110 to, and/or detaching the input device 110 from, a housing of the computing device 100. For example, computing device 100 can include one or more electromagnets 102 (e.g., opposing electromagnets that generate an opposing magnetic field) to assist in detaching an input device 110 attached to the housing of computing device 100 by providing a magnetic field (e.g., when powered) that opposes a magnetic field attracting the input device 110 to the computing device 100. In one example, computing device 100 can also include one or more attracting magnets 104 that can provide the magnetic field that attracts the input device 110 to the computing device 100. For example, the attracting magnets 104 can include one or more permanent magnets that create a persistent magnetic field, one or more electromagnets that create a magnetic field when an electrical current is passed through a coil, one or more permanent electromagnets where a coil can wrap around a portion of a permanent magnet to strengthen the persistent magnetic field when electrical current is passed through a coil, etc. Thus, for example, the one or more attracting magnets 104 can be used to provide an attracting magnetic field that attracts the input device 110 to the housing of the computing device, and the one or more electromagnets 102 can be powered at certain times (e.g., based on detecting an event, such as engagement of a switch, a command from an application, etc.) to generate a magnetic field that at least partially opposes the attracting magnetic field, and thus eases detaching of the input device 110 (e.g., by decreasing a force of the attracting magnetic field provided by the attracting magnets 104).

Further, computing device 100 may include or may otherwise be coupled with a processor 112 and/or memory 114, where the processor 112 and/or memory 114 may be configured to execute or store instructions or other parameters related to executing an electrical control function 116 for controlling the electromagnet(s) 102 (e.g., and/or attracting magnets 104). For example, electrical control function 116 can be implemented to control the electromagnet(s) 102 based on receiving a detach signal (e.g., or an attach signal) to operate the electromagnet(s) 102 in a detach or attach state. As described, the electromagnet(s) 102 can have a detach state where the electromagnet(s) 102 generate a magnetic field that opposes an attracting field provided by the attracting magnets 104. For example, the electrical control function 116 can control the electromagnet(s) 102 to provide the opposing magnetic field at certain periods of time to activate a detach state. In an example, electrical control function 116 may receive a command to enter the detach state, which may be based on processor 112 and/or instructions executing thereon, detecting activation of a switch on the computing device 100 (e.g., a hard-switch, such as a button or key on a keyboard, a switch based on a command from an application or detected key combination, and/or the like), etc.

In some examples, electromagnet(s) 102 and attracting magnet(s) 104 may form magnetic portions of a PEM, such as the PEM 404 shown and described in reference to FIG. 4A below. For example, the PEM can have a body composed of ferromagnetic materials and a permanent magnetic core (e.g., which can be an attracting magnet 104) that can accordingly magnetize the ferromagnetic materials. The PEM may also include an electromagnet portion (e.g., a coil wrapped around the permanent magnet core, which can be an electromagnet 102), that can provide or amplify an opposing magnetic field over the permanent magnet core when power is supplied to the electromagnet portion (e.g., to the coil), which can demagnetize or neutralize the attracting magnetic field and/or ferromagnetic materials of the body of the PEM. Furthermore, though described as being a part of computing device 100, in other examples, processor 112, memory 114, electrical control function 116, electromagnet(s) 102, attracting magnet(s) 104, and/or portions thereof may be part of input device 110 such that input device 110 may provide the attracting and/or opposing magnetic fields. In a specific example, described in further detail below, a housing of computing device 100 may be composed of a ferromagnetic material, and attracting magnet(s) 104 (e.g., permanent magnets, electromagnets, portions of one or more PEMs) of input device 110 can provide the attracting magnetic field to attract the ferromagnetic material of computing device 100 to input device 110, as described. In this example, the input device 110 may also include the electromagnet(s) 102, or electromagnetic portion of one or more PEMs, to generate an opposing magnetic field or otherwise cancel or neutralize the attracting magnetic field.

Moreover, for example, the electrical control function 116 may generate the opposing magnetic field by providing an electrical current to the electromagnet(s) 102, which can cause generation or magnification of a magnetic field via a core and/or a coil (which may be wrapped around the core) being powered by the electrical current. Additionally, for example, the electrical control function 116 may generate the opposing magnetic field by providing the electrical current for a period of time, which can correspond to a duration of time after the initial event that caused the electrical control function 116 to enter the detach state of the electromagnet(s) 102, another event to cause the electrical control function 116 to exit the detach state and/or enter an attach state where the electromagnet(s) 102 are not powered (or are provided with less power), etc. The event to cause the electrical control function 116 to exit the detach state may include, for example, activation (or deactivation) of a switch of the computing device 100 (or input device 110), as described, detecting a period of time after activating the detach state, which may be a configurable period of time, etc. In an example, the electromagnet(s) 102 may have additional states of varying levels of power being provided to the electromagnet(s) 102 to facilitate increased or decreased strength of the opposing magnetic field (and correspondingly decreased or increased strength of the attracting magnetic field).

In an example, computing device 100 may also optionally include a charging element 106 that may receive an electrical current for charging an input device 110 when the input device 110 is attached to the computing device 100, as described further herein. In one example, charging element 106 can be activated to supply the electrical current to the input device 110 when electrical control function 116 detects attachment of the input device 110 to the computing device 100. In another example, attachment of the input device 110 to the computing device 100 (e.g., or a charge receiving element of the input device 110 to the charging element 106) can cause completion of an electrical circuit that can cause the power to be supplied to the input device 110 via the charging element 106.

FIG. 2 is a flowchart of an example of a method 200 for utilizing one or more electromagnets to facilitate detaching an input device from a housing of a computing device in accordance with aspects described herein. For example, method 200 can be performed by a computing device 100 and/or a component thereof to facilitate detachment and/or attachment of the input device 110 to the housing of the computing device.

In method 200, at action 202, an event to detach an input device from a computing device can be detected. For example, electrical control function 116, e.g., in conjunction with processor 112, memory 114, can detect the event to detach the input device 110 from the computing device. For example, the electrical control function 116 can detect the event based at least in part on detecting activation of a switch on the computing device 100 and/or based on receiving indication of activation of the switch from one or more other components of the computing device 100 (e.g., processor 112). In an example, computing device 100 may include a hard-switch coupled to the processor 112 to facilitate detecting activation of the switch.

In another example, the electrical control function 116 can detect activation of a key on a keyboard of the computing device 100 as the event. Moreover, in an example, processor 112 can execute one or more applications that may send a command resulting in the event. For instance, a button on a display (e.g., interface) provided by the application may be activated (e.g., by touch gesture input or other input), which may cause the application to notify the processor 112 and/or electrical control function 116 as the event to detach the input device 110. Similarly, in an example, a touch gesture (e.g., a slide, swipe, or other gesture) detected (e.g., by processor 112 and/or an application executing thereon) near an edge of the display may cause the application to notify the processor 112 and/or electrical control function 116 as the event to detach the input device 110. For example, processor 112 and/or the corresponding application may detect the touch gesture at or near an edge of the display that is near a location of the input device 110 on a housing of the computing device 100 (e.g., near an edge groove as described below). In yet another example, the input device 110 may detect the event (e.g., as a touch gesture, button press, or other input to the input device 110), and can accordingly indicate the event to the processor 112 and/or electrical control function 116 via wireless communication (e.g., Bluetooth, near field communication (NFC)).

In method 200, at action 204, power can be controlled to one or more electromagnets based at least in part on detecting the event. For example, electrical control function 116, e.g., in conjunction with processor 112, memory 114, can control the power to the one or more electromagnets 102 based at least in part on detecting the event. Moreover, as described, the one or more electromagnets 102 may be in the computing device 100 or the input device 110.

In an example, the electrical control function 116 can control the power by activating power to the one or more electromagnets 102 at least in part by providing an electrical current to the one or more electromagnets 102 to cause the one or more electromagnets to generate a magnetic field. As described, for example, the magnetic field may oppose an attracting magnetic field provided by one or more attracting magnets 104 to facilitate or otherwise assist in detaching of the input device 110 (e.g., by canceling out or decreasing the effective magnetic force of the attracting magnetic field). In an example, the electromagnet(s) 102 can include, or can otherwise be coupled to, one or more switches to facilitate powering the electromagnet(s) 102 such to generate the opposing magnetic field, and the electrical control function 116 can accordingly activate the switch to activate power to the one or more electromagnets 102.

In one example, the one or more electromagnets 102 may be an electromagnetic portion of a PEM (e.g., a coil around a permanent magnet core of the PEM), as described above, where the PEM may be included in the computing device 100 or input device 110 to facilitate attaching the input device 110 to the computing device 100 via an attracting magnetic field when the electromagnetic portion of the PEM is not powered and/or to facilitate detaching the input device 110 from the computing device 100 by generating an opposing magnetic field when the electromagnetic portion of the PEM is powered. In one example, the attracting magnetic field may be provided by ferromagnetic materials used to construct a body of the PEM along with a permanent magnet core (e.g., an attracting magnet 104) within the body. In this example, the one or more electromagnets 102 (e.g., an electromagnetic portion of the PEM), when powered, can generate an opposing magnetic force to oppose the attracting magnetic force of the permanent magnetic core, which can demagnetize or neutralize the attracting magnetic field provided by the ferromagnetic materials of the body of the PEM.

In another example, (e.g., where power at the computing device 100 is persistent or otherwise not of concern) the one or more electromagnets 102 may be or may operate in conjunction with the one or more attracting magnets 104 to generate the attracting magnetic field for attracting the input device 110 when powered. In this example, the electrical control function 116 can control the power based on detecting the event by deactivating power to the one or more electromagnets 102 to facilitate detaching the input device 110 with a lesser force than where the one or more electromagnets 102 are powered.

In method 200, optionally at action 206, the power to the one or more electromagnets can be controlled after a period of time or based on another detected event. For example, electrical control function 116, e.g., in conjunction with processor 112, memory 114, can control the power to the one or more electromagnets 102 after a period of time or based on another detected event.

In an example, electrical control function 116 can control the power to deactivate the power from the electromagnet(s) 102. In this example, at least where activating power to the electromagnet(s) 102 causes generation of the opposing magnetic field, the input device 110 can again be attached to the housing of the computing device 100 by the attraction of the attracting magnetic field supplied by attracting magnets 104 (e.g., and/or ferromagnetic materials and permanent magnet core of a PEM), as described. In an example, the electromagnet(s) 102 may be configured to be activated for a period of time, such as a number of seconds (e.g., 3 seconds), such that the electrical control function 116 can detect when power to the electromagnet(s) 102 has been provided for the period of time, and can accordingly terminate the supply of power to electromagnet(s) 102 after the period of time. In another example, the electrical control function 116 can detect the event for terminating the supply of power to the electromagnet(s) 102. The event can include, for example, activation of the same or different switch (e.g., hard-switch, pressing of a key on a keyboard, a command from an application, etc.).

In another example, (e.g., where power at the computing device 100 is persistent or otherwise not of concern) where activating power to the electromagnet(s) 102 causes generating or strengthening of the attracting magnetic field, electrical control function 116 can control the power to activate the power to the electromagnet(s) 102 after the period of time (e.g., for the period of time, based on detecting the event), which in the example above, can cause the input device 110 to again be attracted to the computing device 100 (e.g., by the attracting magnetic field). For example, activating power to the electromagnet(s) 102, in this example, can cause the attracting magnetic field to attract the input device 110 to an attach state at least until another event to detach the input device 110 is detected/received.

Figure 3A:
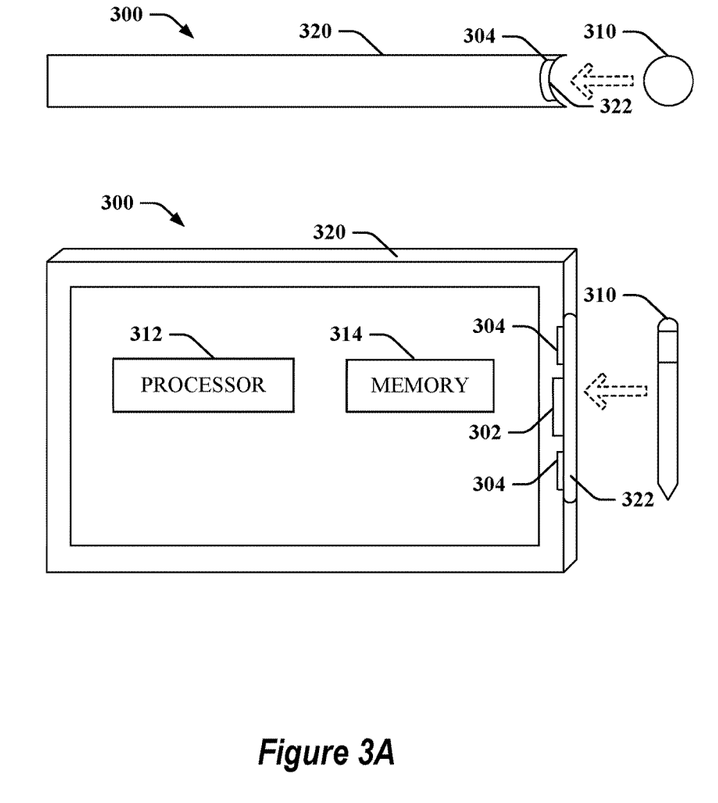
FIG. 3A includes a top view and front perspective view of an example of a computing device in a detach state in accordance with aspects described herein.
Figure 3B:
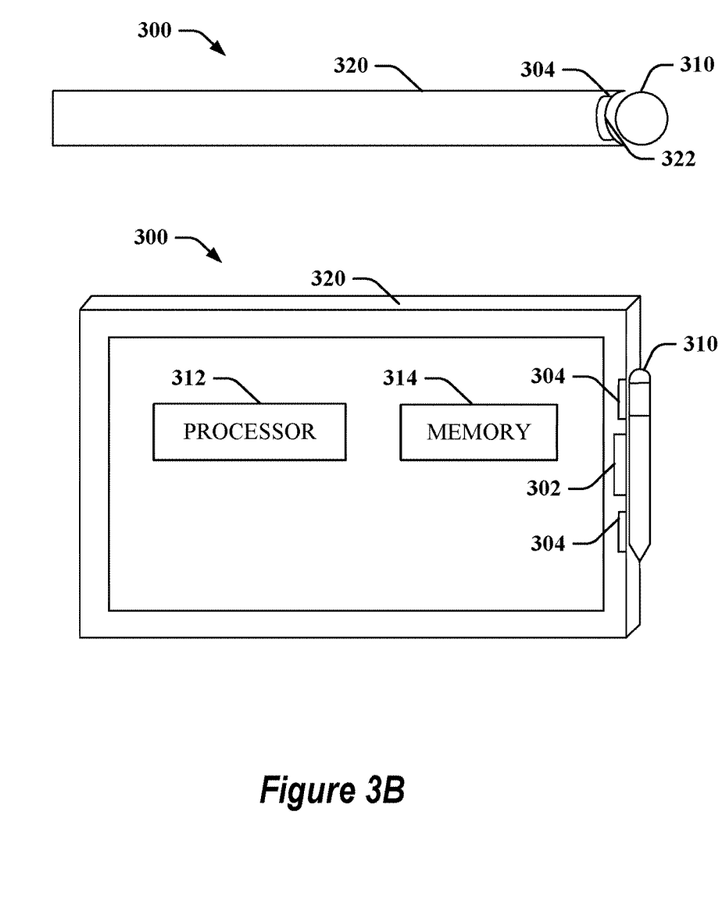
FIG. 3B includes a top view and front perspective view of an example of a computing device in an attach state in accordance with aspects described herein.

FIGS. 3A and 3B are diagrams of a specific example of a computing device 300, each from a top view and front perspective view, in accordance with aspects described herein. FIG. 3A illustrates the computing device 300 with an input device 310 detached from the computing device 300, and FIG. 3B illustrates the computing device 300 with the input device 310 attached to the computing device 300. For example, as described, the computing device 300 can include one or more electromagnets 302 to facilitate generating an opposing magnetic force of a plurality of attracting magnets 304.

In an example, computing device 300 can include a processor 312, memory 314, etc. that may control operations of computing device 300 and/or may control activation of power to the electromagnet(s) 302. For example, computing device 300 can be similar to or otherwise employ computing device 100 and/or one or more components thereof, and input device 310 may be similar to or other employ input device 310. For example, electromagnet(s) 302 can be similar to electromagnet(s) 102, attracting magnets 304 can be similar to attracting magnet(s) 104, processor 312 can be similar to processor 112, memory 314 can be similar to memory 114, etc.

In an example, housing 320 can include an edge groove 322 (e.g., in a side wall of the housing) that can be shaped to receive the input device 310 and at least partially surround the input device 310. In the depicted example, input device 310 can have a cylindrical shape, and the edge groove 322 can have a concave shape to receive and surround at least a portion of the cylinder. The edge groove 322 can also be shaped to fit the input device 310 and to prevent movement of the input device 310 in a longitudinal direction beyond the end walls of the edge groove 322 (e.g., where edge groove 322 has a groove length that matches or is slightly longer than a length of the input device 310). Additionally, the edge groove 322 may have a depth of about ¼ of a diameter of the input device 310 to avoid rotation of the input device out of the edge groove 322. Moreover, in an example, the attracting magnets 304 can be shaped similarly to the edge groove 322 to allow for placement of the attracting magnets 304 adjacent to the edge groove 322 on the inside of housing 320.

Figure 4A:
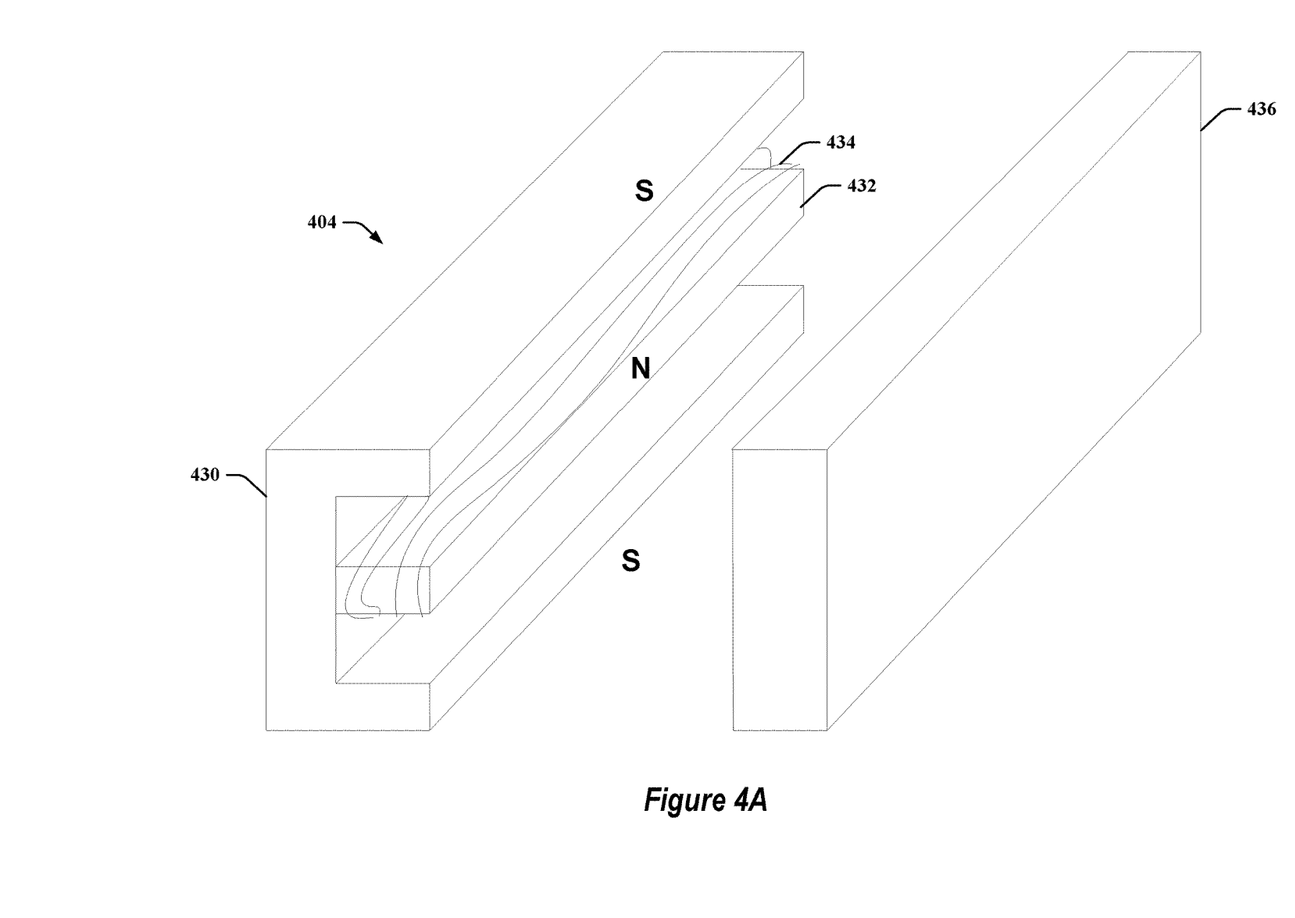
FIG. 4A is a perspective view of an example of an attracting permanent electromagnet in accordance with aspects described herein.
Figure 4B:
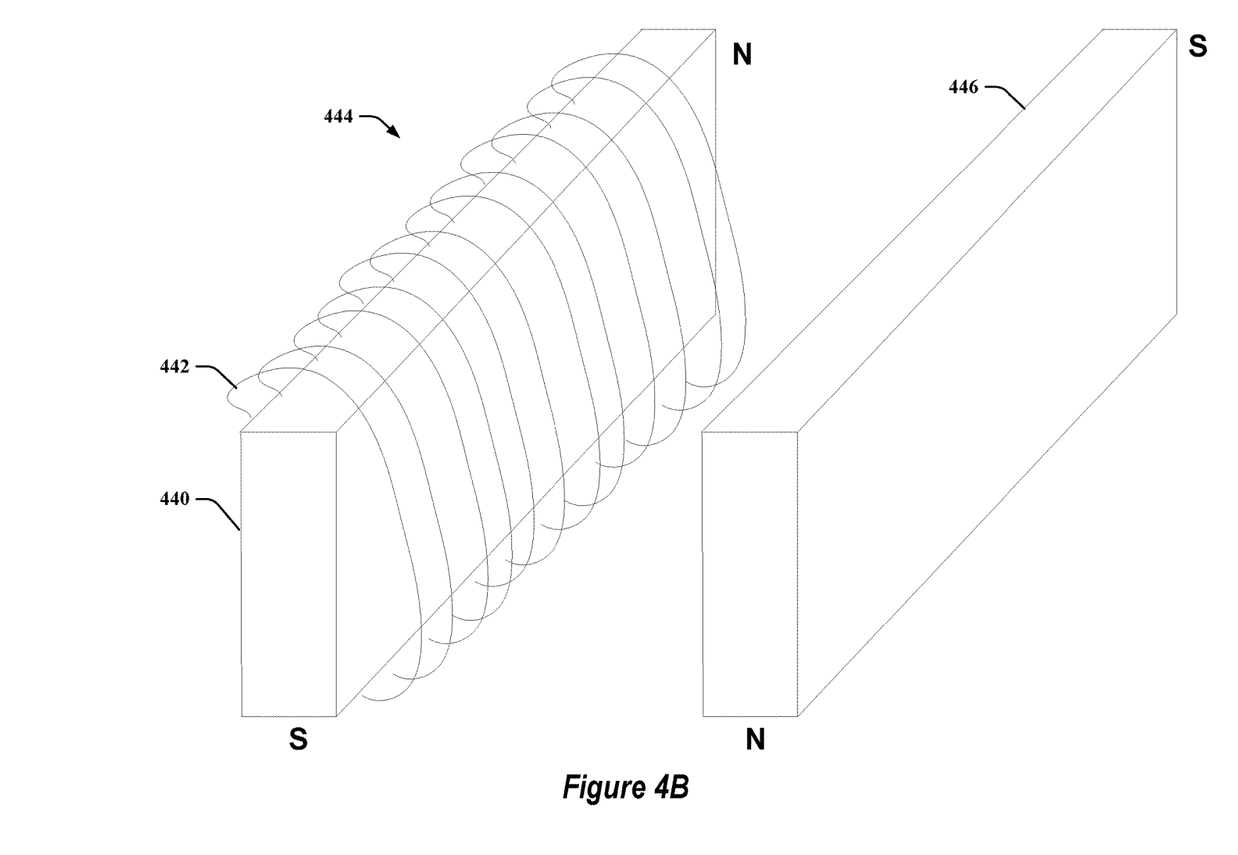
FIG. 4B is a perspective view of an example of an attracting electromagnet in accordance with aspects described herein.

Various configurations of magnets can be used to attract the input device 310 to the housing 320 of the computing device 300, examples of which are shown in FIGS. 4A and 4B. In one example, attracting magnets 304 may form a permanent magnet core of a PEM, and electromagnet 302 can form an electromagnetic portion of the PEM, as described further in FIG. 4A. Additionally, in this example, a body of the PEM can be composed of ferromagnetic materials. Thus, the permanent magnet core, in conjunction with the ferromagnetic materials of the body of the PEM, can generate an attracting magnetic field, and an electromagnetic portion (e.g., a coil wrapped around the permanent magnet core) can generate an opposing magnetic field to oppose the attracting magnetic field of the permanent magnet core when powered. In an example, computing device 300 (and/or input device 310) may include one or more of such PEMs to provide the attracting magnetic field and opposing magnetic field (when the electromagnetic portion is powered).

FIG. 4A illustrates an example of a permanent electromagnet 404 that can provide the one or more electromagnets 302 and/or attracting magnets 304. The permanent electromagnet 404 can include a body 430, which can be composed of ferromagnetic materials, such as steel, a permanent magnet core 432, which can be composed of rare-earth materials, such as iron, a neodymium iron compound, ceramic, etc., which can be attached to the body 430. The permanent magnet core 432 can be one or more attracting magnets 304 that generate an attracting magnetic field. The permanent electromagnet 404 can also include a coil 434 surrounding the permanent magnet core 432, where the coil and ferromagnetic portion can provide an electromagnetic 302 function.

In addition, in an example, the body 430 may have a south pole property created by magnetic flux based on a north pole property of the permanent magnet core 432 (and/or vice versa). This may generate the attracting magnetic field to attract an input device 310, which can include a permanent magnet 436 and/or can be composed of a ferromagnetic material. Additionally, for example, the coil 434 can be an actuator steering coil such that, when supplied with an electrical power, can generate an opposing magnetic field to oppose the attracting magnetic field generated by the permanent magnet core 432. Generation of the opposing magnetic field, as described, can allow for detaching the input device 310 with lesser force while the attracting magnetic field is being opposed by the opposing magnetic field. In another example, as described, PEM 404 may be in the input device 310, and the computing device 300 can include the permanent magnet 346 and/or be composed of the ferromagnetic material.

FIG. 4B illustrates an example of an electromagnet 444 and permanent magnet 446 combination that can be used in the computing device 300 and input device 310. In this example, the electromagnet 444 can be employed as the one or more electromagnets 302, and can include a core 440 composed of a ferromagnetic material (e.g., steel), and a coil 442 surrounding the core 440. The permanent magnet 446 can be composed of rare-earth materials, such as iron, a neodymium iron compound, ceramic, etc., and can be the one or more attracting magnets 104 to provide the attracting magnetic field (though permanent magnet 446 may be in the input device 310). Thus, the permanent magnet 446 in the input device 310 may be attracted to the ferromagnetic materials of the core 440 of the electromagnet 444. In an example, the coil 442 can be an actuator steering coil such that, when supplied with an electrical power, the coil 442 can (and/or core 440) can provide an opposing magnetic field to oppose the magnetic field generated by permanent magnet 446 to facilitate eased detaching of the input device 310 from the computing device 300.

In another example, electromagnet 444 can be configured to generate or amplify an attracting magnetic force across core 440 when electrical power is supplied to coil 442, such to attract permanent magnet 446, which may be within the input device 310. In this example, power can be terminated from the coil 442, as described in examples above, to terminate the attracting magnetic field, and allow for eased detaching of the input device 310 from the computing device. In another example, as described, electromagnet 444 may be in the input device 310, and the computing device 300 can include the permanent magnet 446 and/or be composed of the ferromagnetic material.

Referring to FIG. 3, for example, when the electromagnet(s) 302 are in the attach state, the electromagnet(s) 302 can remain unpowered. The attracting magnets 304 can provide an attracting magnet field having a force sufficient to prevent the input device 310 from being easily removed or knocked off of the computing device 300. For instance, one example of such an attracting magnetic field produces a force sufficient to prevent a user or an unexpected movement from removing the input device 310 to attract the input device 310 to the edge groove 322. For example, the force can be substantially equal to or based on a weight of the computing device 300. In one specific example, the force of the attracting magnets 304 can be around 2 kilograms (kg). Moreover, for example, the force can be such that the attraction between the computing device 300 and the input device 310 is as described, and rotation of the input device 310 in the housing may be prevented. This attracting magnetic field may remain unopposed when the electromagnet(s) 302 are in the attach state. The electromagnet(s) 302 can be switched to operate in a detach state when one or more conditions are detected, such as activation of a switch on the computing device 300 (e.g., a hard-switch, a key on a keyboard, a command from an application such as a detected touch gesture input on a display of the computing device 300, executing an application that utilizes the input device 310, and/or the like). For example, when the electromagnet(s) 302 are switched to the detach state, a coil of the electromagnet(s) 302 can be powered to provide an opposing magnetic field to oppose the attracting magnetic field provided by attracting magnets 304.

In an example, the electromagnet(s) 302 can include or otherwise be coupled to a switch, which can be situated between a power source (e.g., an electrical current) and a coil of the electromagnet(s) 302, such that activating the switch can supply power to the one or more electromagnet(s). For example, the opposing magnetic field can lessen the effect of the ~2 kg force of the attracting magnets 304 on the input device 310 to facilitate eased detaching of the input device 310 from the housing 320. In one example, a field strength value of the opposing magnetic field can be less than a field strength value of the attracting magnetic field, such that the effective attracting magnetic field can be reduced (e.g., from about 2 kg of force to a force of 0.65-0.9 kg). This can prevent the input device 310 from falling from the housing 320 when the electromagnet(s) 302 are in the detach state (e.g., as may be the case if the field strength value of the opposing magnetic field were greater than the field strength value of the attracting magnetic field). In other examples, however, the field strength value of the opposing magnetic field can be equal to or greater than the field strength of the attracting magnetic field as well, which may cause the input device 310 to more easily release or drop from the housing 320 when the opposing magnetic field is activated.

The electromagnet(s) 302 can remain in the detach state for a period of time, which can be defined based at least in part on activating the detach state, after which the electromagnet(s) 302 can be switched to the attach state where power is removed from the electromagnet(s) 302 (e.g., by deactivating the switch). In one example, the period of time may be configured by a manufacturer in designing or manufacturing the computing device 300, which can correspond to a time determined to be an amount of time it may take a user to detach the input device 310 from the computing device 300. For example, the electromagnet(s) 302 can remain in the detach state for a fixed or configurable period of time after entering the detach state, based on detecting one or more events after entering the detach state (e.g., activation of a same or different hard-switch, key on a keyboard, command from an application, etc.), and/or the like.

In addition, though generally described as being in the computing device 300, in one example, the one or more electromagnets 302 can additionally or alternatively be situated within the input device 310, such that the opposing magnetic field may be generated by the input device 310. This may be based on the event detected at the computing device 300, an event on the input device 310 (e.g., activation of a switch on the input device 310), etc. In this example, the opposing magnetic field generated by the input device 310 may be sufficient to cancel at least a portion of the attracting magnetic field provided by attracting magnets 304.

Figure 5:
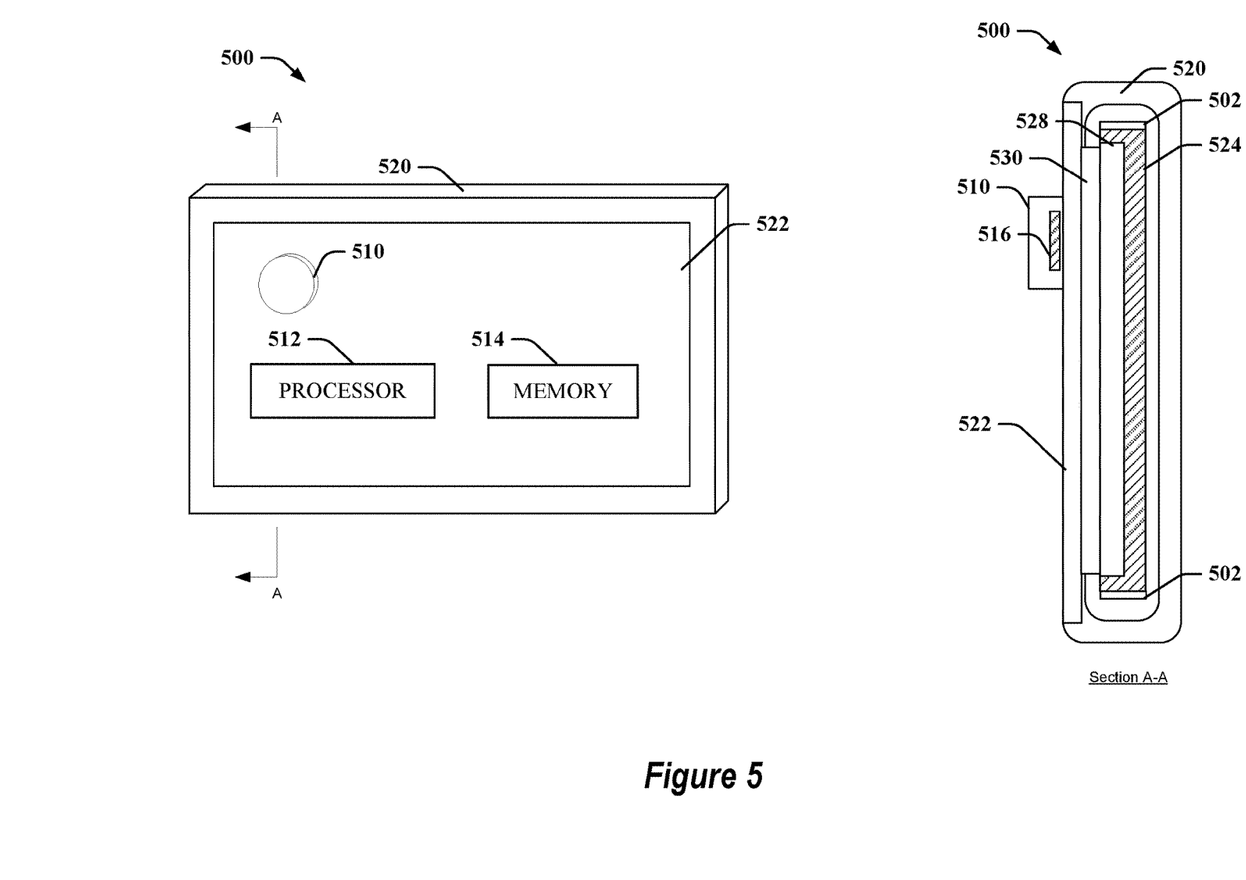
FIG. 5 includes a front perspective view and partial cross-sectional view along line A-A of the front perspective view of an example of a computing device and input device in accordance with aspects described herein.

FIG. 5 illustrates a schematic diagram of another specific example of a computing device 500 from a front perspective view and side view in accordance with aspects described herein. For example, as described, the computing device 500 can include one or more electromagnets 502 positioned within a housing 520 to facilitate generating an opposing magnetic force of one or more attracting magnets forming a magnetic surface 524. In an example, computing device 500 can include a processor 512, memory 514, etc. that may control operations of computing device 500 and/or may control activation of power to the electromagnet(s) 502. For example, computing device 500 can be similar to or otherwise employ computing device 100 and/or one or more components thereof. For example, electromagnet(s) 502 can be similar to electromagnet(s) 102, magnetic surface 524 can include or can otherwise be magnetized by one or more attracting magnets similar to attracting magnet(s) 104, 304, 404, processor 512 can be similar to processor 112, memory 514 can be similar to memory 114, etc.

In an example, computing device 500 can include an input device 510 that can allow for performing various functions on the computing device 500. For example, input device 510 can attach to a touch panel 522 of the computing device 500 via magnetic attraction, and/or can cause or provide display of one or more interfaces (e.g., a toolbar) corresponding to the input device 510. Computing device 500 can include, for example, the touch panel 522 embedded in the housing 520, which can form part of a touch-enabled display, as described herein. In this example, computing device 500 can also include the magnetic surface 524, which can be magnetic or metal case that holds a display 528 (e.g., a liquid crystal display (LCD)). Moreover, for example, computing device 500 can include an adhesive layer 530 (e.g., composed of an optical clear adhesive (OCA)) between the display 528 and touch panel 522 to provide the touch-enabled display. The magnetic surface 524 may provide an attracting magnetic field for the input device 510, for example. The input device 510 may also include a magnetic device 516 (e.g., a permanent magnet) that is attracted by the magnetic surface 524. For example, various configurations can be used to attract the input device 510 to the touch panel 522 (e.g., via the magnetic surface 524 beneath the touch panel 522) of the computing device 500, such as those described in FIGS. 4A and 4B. For example, the magnetic surface 524 may include one or more attracting magnets 104, such as a permanent electromagnet 404, electromagnet 444, etc., as described, and the input device 510 may include one or more magnets 436, 446, etc. and/or can be composed of a ferromagnetic material to attract the input device 510 to the magnetic surface 524.

In another example, magnetic surface 524 can be composed of ferromagnetic materials, and the input device 510 can include one or more permanent magnets, electromagnets, PEMs, etc. to generate an attracting magnetic field to attract the input device 510 to the magnetic surface 524. Similarly, in this example, input device 510 can include the one or more electromagnets (or electromagnetic portion of one or more PEMs) to generate an opposing magnetic field to ease detaching of input device 510 from the computing device 500 (e.g., based on a detected event/command, duration of time, etc., as described above).

In an example, computing device 500 may also include one or more electromagnets 502, which can be positioned around the housing 520, at one or more locations beneath the touch panel 522, etc. (e.g., to oppose a region of the magnetic surface 524). As described, for example, the one or more electromagnets 502 may have a detach state where the one or more electromagnets 502 can be powered (e.g., by an electrical control function executed by processor 512) for a period of time to decrease the magnetic attraction of the magnetic surface 524 and allow movement of the input device 510 to another location of the touch panel 522. For example, the one or more electromagnets 502 can generate an opposing magnetic field that opposes an attracting magnetic field provided by the magnetic surface 524.

In any case, in one example, a field strength value of the opposing magnetic field can be less than a field strength value of the attracting magnetic field, such that the effective attracting magnetic field can be reduced (e.g., but not completely opposed). This can allow the input device 510 to remain attached to the touch panel 522 by a weaker force (e.g., from about 2 kg of force to a force of 0.65-0.9 kg) to allow movement of the input device 510 on the touch panel 522. The input device 510 can remain attached when the computing device 500 is tilted towards an upward position, as shown in the side view of FIG. 5. After a period of time or detection of an event, as described previously, the one or more electromagnets 502 can be switched to an attach state where power supply can be terminated for the electromagnets 502 (and thus the opposing magnetic force can be terminated).

Figure 6:
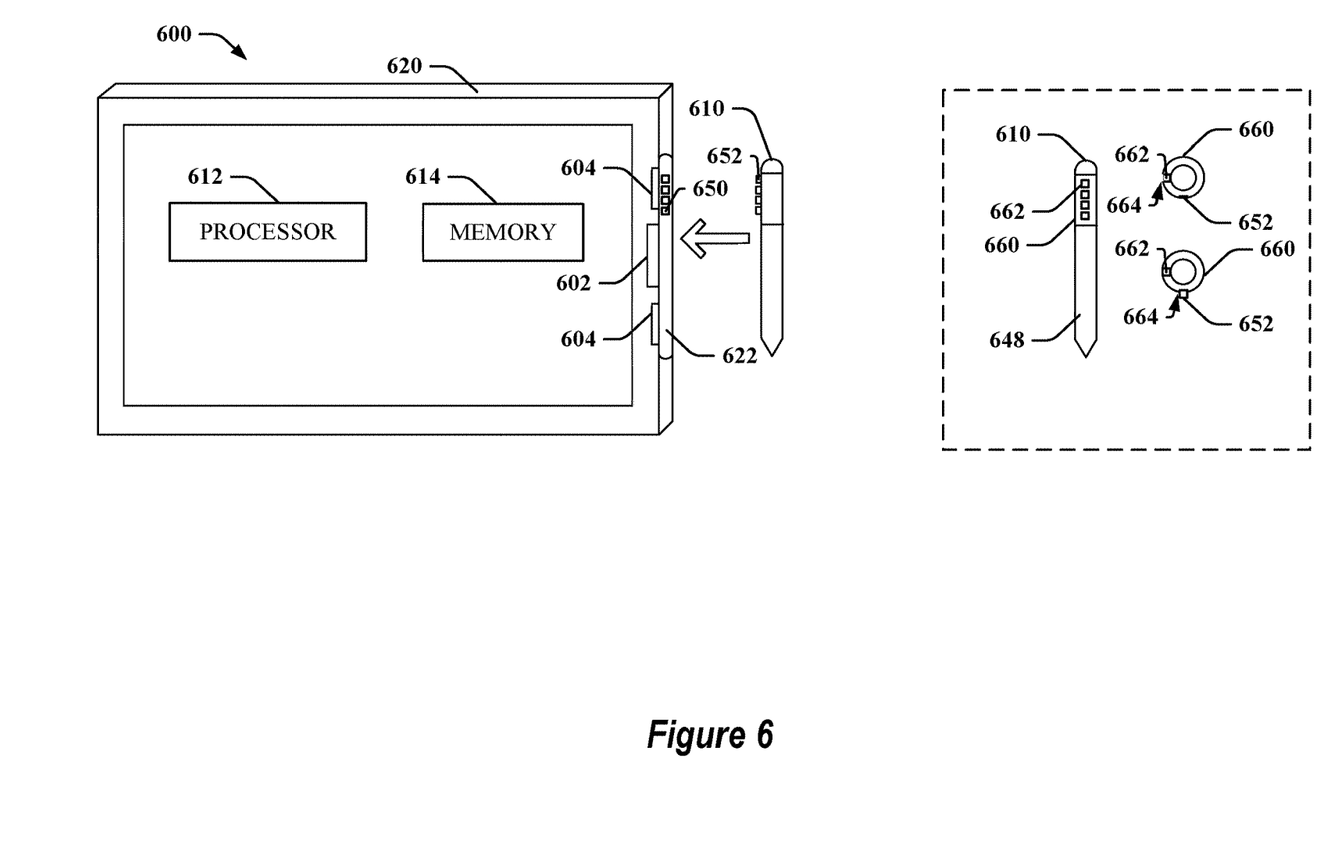
FIG. 6 includes a front perspective view of an example of a computing device and input device having a rotatable member, and separate front and top views of the input device, in accordance with aspects described herein.

FIG. 6 illustrates a schematic diagram of a specific example of a computing device 600 from a front perspective in accordance with aspects described herein. FIG. 6 illustrates the computing device 600 with an input device 610 detached from the computing device 600. For example, computing device 600 can be similar to computing device 300, as described above, and may thus also include one or more electromagnets 602, similar to one or more electromagnets 302, to facilitate generating an opposing magnetic force of a plurality of attracting magnets 604 that attract input device 610 to a housing 620 of the computing device 600. In an example, computing device 600 can also include a processor 612, similar to processor 312, memory 614, similar to memory 314, etc. Input device 610 may be similar to input device 310, in an example.

In an example, housing 620 can also include an edge groove 622, which is similar to edge groove 322, to receive input device 610. For example, the computing device 600 can also include a charging element 650, which may include one or more pins, for supplying electrical power to the input device 610 (e.g., to charge a battery of the input device 610). For example, the charging element 650 can be similar to charging element 106 and can thus receive an electrical signal from the computing device 600 (e.g., via a power source of the computing device 600). In an example, the charging element 650 can couple to a charge receiving element 652 on the input device 610, which may include one or more contact pins, to transfer electrical power to the input device 610. The input device 610 can accordingly include circuitry to couple the one or more contact pins of the charge receiving element 652 to a battery (not shown) that operates the input device 610 to allow charging of the battery through the coupling with the charging element 650. In an example, an electrical circuit can be completed when the charge receiving element 652 couples to the charging element 650, which can provide an electrical current to the charge receiving element 652 to cause power to be distributed to the input device 610 via the charge receiving element 652.

FIG. 6 also depicts an alternative possible configuration of the input device 610, where the input device 610 includes one or more indicators 662, which may be light emitting diodes (LED) or other suitable indicators, for indicating a charge level or other parameter related to the input device 610. For example, input device 610 can also include a housing 648 and rotatable member 660 that can rotate around at least a portion of the housing 648. For example, the rotatable member 660 can define one or more apertures 664 positioned on the rotatable member 660 such to allow light from the one or more indicators 662 through the aperture(s) 664 and/or to allow protrusion of the one or more contact pins of the charge receiving element 652 (e.g., depending on a rotated position of the rotatable member).

For example, as depicted, in a first rotational position, the aperture(s) 664 of the rotatable member 660 can be positioned over the indicator(s) 662 to allow light from the indicator(s) 662 to be displayed from the aperture(s) 664. In a second rotational position, the aperture(s) 664 of the rotatable member 660 can be positioned over the charge receiving element 652 (e.g., the one or more contact pins) to allow the one or more contact pins to protrude through the aperture(s) 664. In one example, the one or more contact pins of the charge receiving element 652 can have a spring-loaded action (also referred to as "pogo pins") to allow the one or more contact pins to protrude when the aperture(s) 664 are positioned over the one or more contact pins and/or collapse when the rotatable member 660 is rotated to another rotational position where the aperture(s) 664 are not positioned over the one or more contact pins.

Accordingly, when charging is desired, for example, the rotatable member 660 can be rotated to the second rotational position where the aperture(s) 664 are over the one or more contact pins of the charge receiving element 652 to facilitate protrusion of the one or more contact pins, and the input device 610 can be coupled to the housing 620 of the computing device 600 with the one or more contact pins facing the one or more pins of the charging element 650. Where operation of the input device 610 is desired, the input device 610 can be released from the computing device 600 (e.g., via activation of the one or more electromagnets 602), and the rotatable member 660 can be rotated to the first rotational position where the aperture(s) 664 are over the one or more indicators 662 to allow display of the one or more indicators 662 (e.g., to indicate the charge level, one or more other parameters of the input device 610, that the input device 610 is in an operation mode, etc.).

An example device includes a housing including at least one component of the computing device, an input device removably attachable to at least a portion of the housing, and one or more electromagnets mounted within the housing, where the one or more electromagnets have a detach state that generates a first magnetic field in a direction that opposes a second magnetic field that attracts the input device to the housing.

Another example device of any preceding device includes where a first field strength value of the first magnetic field is less than a second field strength value of the second magnetic field.

Another example device of any preceding device includes a switch coupled to the one or more electromagnets where activation of the switch causes power to be supplied to the one or more electromagnets to generate the first magnetic field for at least a period of time.

Another example device of any preceding device includes where the switch is activated based on detecting activation of a key on the housing or on a keyboard of the computing device.

Another example device of any preceding device includes where the switch is activated by an application executing on a processor of the computing device.

Another example device of any preceding device includes one or more permanent magnets mounted within the housing and adjacent to a side wall of the housing to which the input device is attracted, where the one or more permanent magnets generate the second magnetic field.

Another example device of any preceding device includes where the one or more permanent magnets and the one or more electromagnets form a permanent electromagnet (PEM).

Another example device of any preceding device includes one or more permanent magnets mounted within the input device to which the computing device is attracted, where the housing is composed of a ferromagnetic material, and where the one or more permanent magnets generate the second magnetic field.

Another example device of any preceding device includes one or more permanent magnets mounted within the housing and adjacent to a display of the computing device, where the one or more permanent magnets generate the second magnetic field to attract the input device to the display.

Another example device of any preceding device includes one or more permanent magnets mounted within the input device, where the housing adjacent to a display of the computing device is composed of a ferromagnetic material, and where the one or more permanent magnets generate the second magnetic field to attract the input device to the housing.

Another example device of any preceding device includes where the housing comprises an edge groove within which the input device is attracted to the housing by the second magnetic field.

Another example device of any preceding device includes where the input device has a cylindrical shape and the edge groove has a concave shape to receive the input device.

Another example device of any preceding device includes where the edge groove further comprises a charging element exposed from the edge groove and positioned to contact a charge receiving element of the input device when the input device is attached to the housing.

Another example device of any preceding device includes where the charging element supplies an electrical current to the charge receiving element based at least in part on detecting completion of an electrical circuit at the charging element.

Another example device of any preceding device includes where the input device comprises a pen device.

An example method includes detecting, via a processor, an event to detach the input device from the computing device, where the input device is removably attached to the computing device, and activating, via the processor, power to one or more electromagnets based at least in part on detecting the event, where the one or more electromagnets have a detach state that, when powered, generate a first magnetic field in a direction that opposes a second magnetic field that attracts the input device to a housing of the computing device.

Another example method of any preceding method includes where a first field strength value of the first magnetic field is less than a second field strength value of the second magnetic field.

Another example method of any preceding method includes where the event corresponds to at least one of activation of a key on the housing or a keyboard of the computing device, or a command from an application executing on a processor of the computing device.

Another example method of any preceding method includes where the event corresponds to a button press on the input device.

Another example method of any preceding method includes deactivating the power to the one or more electromagnets after a period of time.

An example device includes a housing, a plurality of indicators for indicating one or more parameters of the input device, a plurality of contact pins providing a charge receiving element for charging a battery of the input device, and a rotatable member rotatable around at least a portion of the housing, wherein the rotatable member defines a plurality of apertures, where the rotatable member is rotatable to a first rotational position over the plurality of indicators to facilitate display of light from the plurality of indicators through the plurality of apertures, and a second rotational position over the plurality of contact pins to facilitate protrusion of the plurality of contact pins from the plurality of apertures.

Another example device of any preceding device includes where the plurality of contact pins collapses when the rotatable member is rotated from the second rotational position to another rotational position.

Another example device of any preceding device includes where the plurality of contact pins couple to a plurality of pins on the computing device to receive an electrical current for charging the battery of the input device.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computing device, comprising:
a housing including at least one component of the computing device;
an input device removably attachable to at least a portion of the housing; and
one or more electromagnets mounted within the housing, wherein the one or more electromagnets have a detach state that generates a first magnetic field in a direction that opposes a second magnetic field that attracts the input device to the housing, wherein, in the detach state, a first field strength value of the first magnetic field is less than a second field strength value of the second magnetic field,
wherein the one or more electromagnets have an attach state where the one or more electromagnets are not powered or are provided with less power than in the detach state
wherein the computing device is configured to determine a period of time for remaining in the detach state, and
wherein the one or more electromagnets are configured to remain in the detach state for the period of time after entering the detach state.

2. The computing device of claim 1, further comprising a switch coupled to the one or more electromagnets where activation of the switch causes power to be supplied to the one or more electromagnets to generate the first magnetic field for at least a period of time.

3. The computing device of claim 2, wherein the switch is activated based on detecting activation of a key on the housing or on a keyboard of the computing device.

4. The computing device of claim 2, wherein the switch is activated by an application executing on a processor of the computing device.

5. The computing device of claim 1, further comprising one or more permanent magnets mounted within the housing and adjacent to a side wall of the housing to which the input device is attracted, wherein the one or more permanent magnets generate the second magnetic field.

6. The computing device of claim 5, wherein the one or more permanent magnets and the one or more electromagnets form a permanent electromagnet (PEM).

7. The computing device of claim 1, further comprising one or more permanent magnets mounted within the input device to which the computing device is attracted, wherein the housing is composed of a ferromagnetic material, and wherein the one or more permanent magnets generate the second magnetic field.

8. The computing device of claim 1, further comprising one or more permanent magnets mounted within the housing and adjacent to a display of the computing device, wherein the one or more permanent magnets generate the second magnetic field to attract the input device to the display.

9. The computing device of claim 1, further comprising one or more permanent magnets mounted within the input device, wherein the housing adjacent to a display of the computing device is composed of a ferromagnetic material, wherein the one or more permanent magnets generate the second magnetic field to attract the input device to the housing.

10. The computing device of claim 1, wherein the housing comprises an edge groove within which the input device is attracted to the housing by the second magnetic field.

11. The computing device of claim 10, wherein the input device has a cylindrical shape and the edge groove has a concave shape to receive the input device.

12. The computing device of claim 10, wherein the edge groove further comprises a charging element exposed from the edge groove and positioned to contact a charge receiving element of the input device when the input device is attached to the housing.

13. The computing device of claim 12, wherein the charging element supplies an electrical current to the charge receiving element based at least in part on detecting completion of an electrical circuit at the charging element.

14. The computing device of claim 1, wherein the input device comprises a pen device.

15. A method for detaching an input device from a computing device, comprising:
detecting, via a processor, an event to detach the input device from the computing device, where the input device is removably attached to the computing device;
activating, via the processor, power to one or more electromagnets based at least in part on detecting the event,
wherein the one or more electromagnets have a detach state that, when powered, generate a first magnetic field having a first field strength value in a direction that opposes a second magnetic field having a second field strength value that attracts the input device to a housing of the computing device, wherein the first field strength value is less than the second field strength value; and
determining a period of time for remaining in the detach state,
wherein the one or more electromagnets are configured to remain in the detach state for the period of time after entering the detach state.

16. The method of claim 15, wherein the event corresponds to at least one of activation of a key on the housing or a keyboard of the computing device, or a command from an application executing on a processor of the computing device.

17. The method of claim 15, wherein the event corresponds to a button press on the input device.

18. The method of claim 15, further comprising deactivating the power to the one or more electromagnets after a period of time.

19. The computing device of claim 1, wherein the period of time comprises a fixed period of time or a configurable period of time.

20. The computing device of claim 1, wherein the computing device is configured to determine the period of time in response to an initial event that causes the one or more electromagnets to enter the detach state, in response to a time period after entering the detach state, or in response to another event that causes the one or more electromagnets to exit the detach state and/or enter an attach state.

21. The method of claim 15, wherein the period of time comprises a fixed period of time or a configurable period of time.

22. The method of claim 15, further comprising determining the period of time in response to an initial event that causes the one or more electromagnets to enter the detach state, in response to a time period after entering the detach state, or in response to another event that causes the one or more electromagnets to exit the detach state and/or enter an attach state.

* * * * *